Jan. 27, 1959  J. HÜBL  2,870,663
WORK FEEDING AND TRANSFER MECHANISMS
Filed June 24, 1953  2 Sheets-Sheet 1
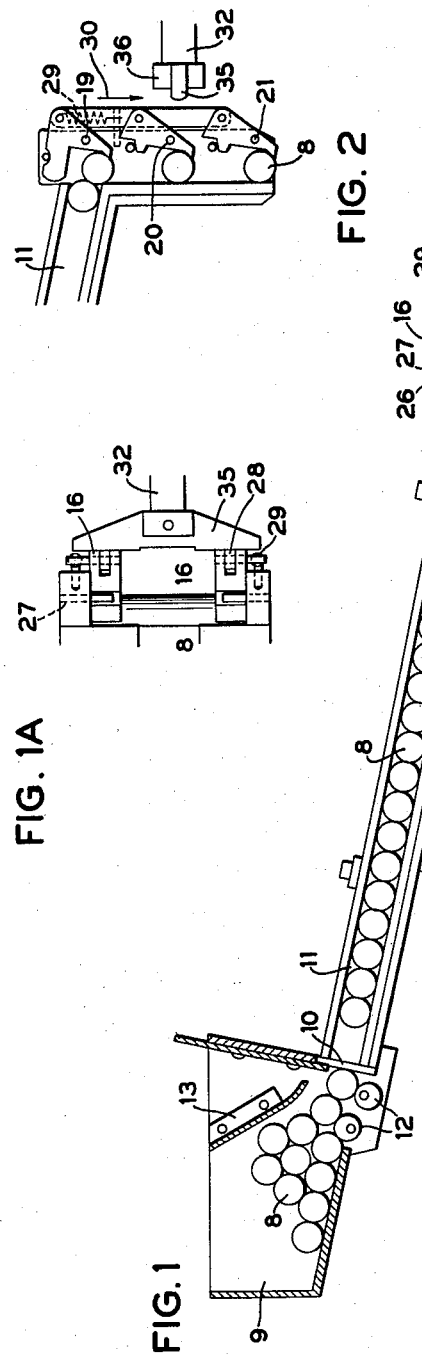
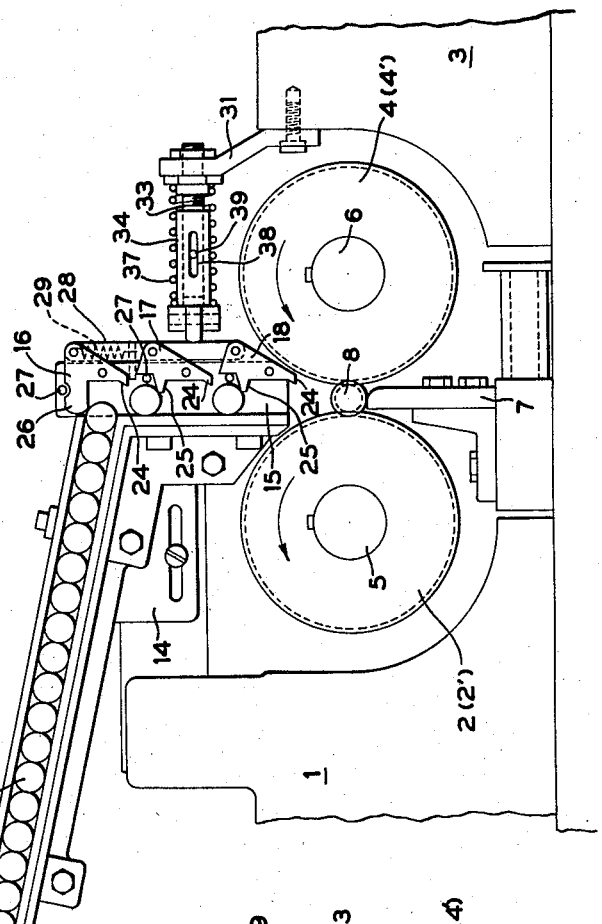
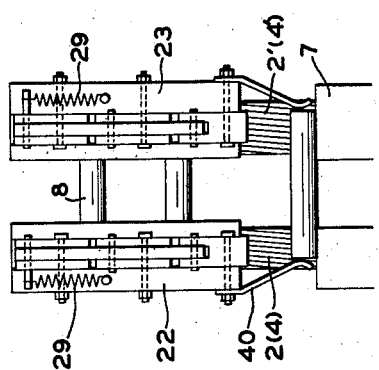
INVENTOR
JOHANN HÜBL
BY Strauch, Nolan & Diggins
ATTORNEYS

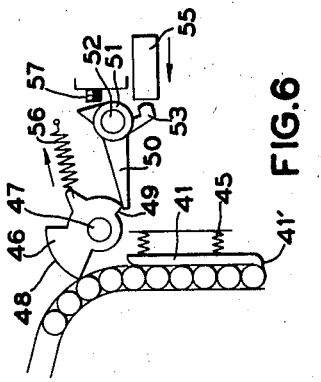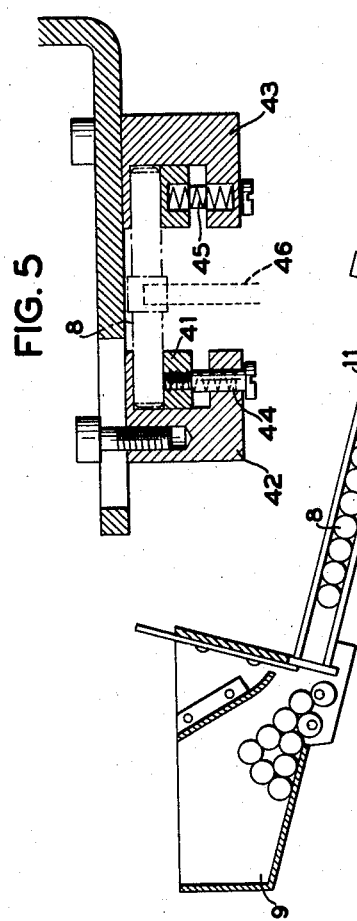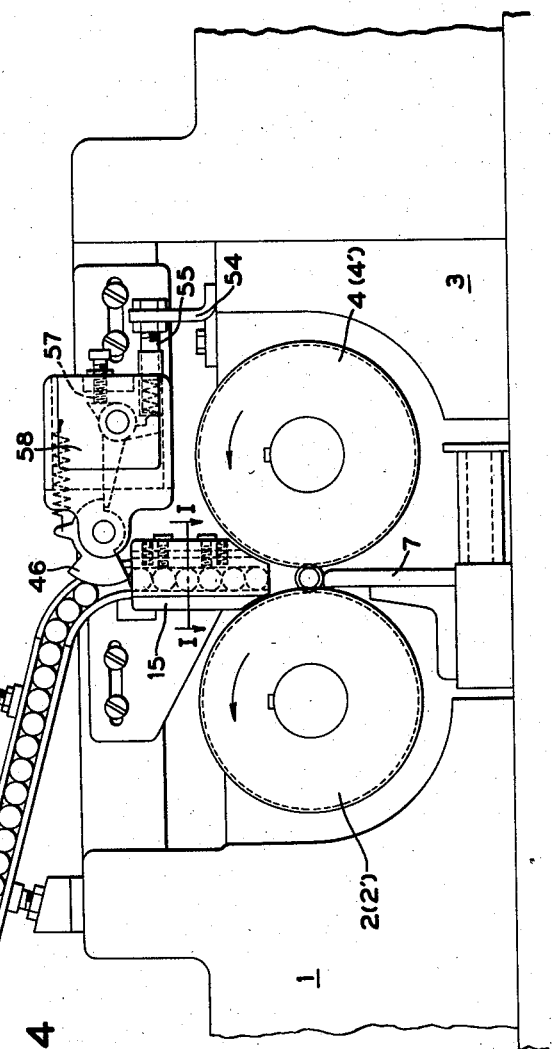

2,870,663
WORK FEEDING AND TRANSFER MECHANISMS

Johann Hübl, Berlin-Halensee, Germany, assignor, by mesne assignments, to Landis Machine Company, Waynesboro, Pa., a corporation of Pennsylvania Application June 24, 1953, Serial No. 363,876

2 Claims. (Cl. 80—6)

The invention concerns mechanism for transferring classified work pieces, for example studs. Mechanisms of this kind are known which are provided with escapements mounted in the vertical part of a feeding chute, which catch the falling work pieces and bring them step by step to the end of the feed chute. For this purpose a number of rockable flaps or holders, one above the other, have been constructed in the chute. These yield under the weight of the work pieces, so that the work pieces are delivered successively to the next lower flap or holder, and return to their original position under the influence of a counter-weight or spring when no work pieces are within reach.

This known mechanism serves to feed the work pieces to tools which remove the work pieces and proposes, in the case of work pieces whose center of gravity does not fall on the longitudinal center, as in the case of cartridges, to avoid the disorder which is caused when the work pieces falling into the entrance end of the chute do not lie parallel to or alongside the preceding work piece but stand upright. In this mechanism it may occur that the chute equipped with flaps is full of work pieces so that all of the flaps are then in the retracted position in which they do not stop the work pieces. Furthermore, each flap gives way under the weight of the work piece falling upon it and delivers it to the succeeding flap until the end of the chute is reached. Therefore this feeding mechanism is not suitable for use with machine tools equipped with horizontal rolling tools, for example thread rolling machines, in which the feed chute is located above the working position between the rolls, because all of the work pieces would fall out of the chute at once.

A mechanism is known for feeding nuts which is provided with a movable rod projecting into the feed chute which alternately moves forward and retracts. But this mechanism serves to orient the nuts which are fed into a chute which is narrowed to the width across the flats thereof.

For machine tools which operate with horizontal rolls, for example thread rolling machines, special requirements are placed on the feeding mechanism, since it is essential that the work pieces be brought between the rolls prior to the operation thereof the rolls then being moved toward each other to operate upon the work piece. For this purpose one roll is stationary and the other is movable on a slide perpendicular to the direction of the axis of the machine tool. A feeding mechanism for thread rolling machines is known in which a slide removes the work piece from a magazine, brings it to the working position and removes it therefrom after it has been operated upon. In this mechanism the work piece to be formed is moved by a finger to the receiving position of the slide and the slide then carries it between the rolls in synchronism with the operation; thus a delaying mechanism is necessary for this movement. This feeding mechanism does not utilize a feed chute; the work pieces are fed directly from the magazine to the receiving position of the slide. It is therefore also disadvantageous that the work piece must carry out two motions which form an angle to each other, since this fact considerably increases the space requirements of the mechanism; and that the magazine is located behind the rolls and is therefore difficult of access.

Feeding mechanisms for thread rolling machines are also known which avoid these disadvantages. They employ a magazine with a feed chute which discharges above a roll and is filled with work pieces from the full magazine. In this mechanism the roll is provided with a recess for transferring the work piece; the roll removes the work piece from the feed chute, brings it to the work position between the rolls and then operates upon it. However, this feeding mechanism is involved with the special form of the roll, so that such machines can operate only with special rolls.

This invention avoids these disadvantages by the fact that the escapements arranged in the vertical position of the feed chute which bring the work pieces step by step to the end of the feed chute and thence to the working position or the work pieces in the feed chute are controlled by the reciprocation of a slide of a thread rolling machine, for example, which slide carries horizontal rolls. The invention has the advantage that the feed chute can be positioned directly between the rolls and terminates close above the work rest which is between the rolls, as in a thread rolling machine or centerless grinding machine, and the work pieces being fed arrive one by one at the end of the feed chute, depending upon the reciprocation of the roll and therefore only a small amount of free fall to the work rest is required. If this feeding mechanism is used on a thread rolling machine, standard cylindrical threading rolls can be employed.

A suitable embodiment of the invention is one in which the escapements have holding projections on both sides of their rotative axes, which projections extend into the chute and contact the work pieces alternately. The escapements are connected, one under the other, outside the chute by a linkage of parallelogram form arranged parallel to a line joining their centers of rotation. An abutment is secured on the slide, which abutment strikes the linkage when the rolls come together and operates all of the escapements simultaneously. This simultaneous control of all escapements mounted in the chute results in dropping the work pieces being fed step by step from escapement to escapement in synchronism with the machine work cycle, so that the vertical portion of the feed chute cannot at any time be completely filled with work pieces and therefore objectionably high pressure on the escapements is avoided. Furthermore, because of the parallelogram arrangement of the linkage, it is possible to make the vertical portion of the feed chute as long as desired and to bring the end of the feed chute between the rolls, since the escapements mounted in the feed chute are independent of the height of the abutment secured to the slide to operate them.

Another modification of the invention is one in which one or more retaining strips are resiliently mounted in the vertical portion of the chute. These strips are parallel to the opposite wall of the chute, are adjustable to the diameter of the work piece, lie resiliently against all work pieces in the vertical part of the chute and hold them stationary. In the chute above the retaining strips are interposed one or more levers with a retracting spring. These levers contact the work pieces and have a throw which corresponds to the diameter thereof. Further, the levers can be contacted, via a lever mechanism by an abutment mounted on the slide and they are formed and arranged in such a way that, upon engaging the work pieces in the vertical portion of the feed chute, they stop the remaining work pieces. The modification in this embodiment resides in the fact that a resilient retaining strip, extending over the vertical portion of the feed chute, is provided for all work pieces in this portion instead of several controlled holding projections and that one or more levers, extending into the feed chute and engaging the work pieces, are provided instead of the control mechanism for the escapements. Since the space available for the slide movement for controlling the release of work pieces is limited, it is suitable, in this embodiment, to provide a ratio mechanism between the abutment and the work-engaging lever. Since the throw of the lever must be adjustable in accordance with the diameter of the particular work piece, it is suitable to make the ratio mechanism adjustable.

Further, it is advantageous to arrange the escapements or retaining strips on both sides of the chute and to make the abutment on the slide resilient. The double arrangement of the escapements has the advantage that the feeding mechanism can also be used for long work pieces such as studs. The resilient abutment insures against overloading and permits further feeding movement of the rolls.

The feeding mechanism can also be used in the packing industry.

The subject matter of the invention is shown in the drawing in two exemplary embodiments which are applied to thread rolling machines. In the drawings:

Fig. 1 shows the feeding mechanism operating by means of escapements, in elevation and partially in section, Figure 1A is a fragmentary plan view of a portion of the mechanism of Figure 1, Fig. 2 shows the position of the escapements when the abutment is withdrawn, Fig. 3 is a side view of the vertical portion of the feed chute, Fig. 4 shows another embodiment of the feeding mechanism with resilient retaining strips, Fig. 5 is a sectional view through the feed chute, along line I—I of Figure 4 and Fig. 6 is a diagrammatic representation.

The frame 1 of the thread rolling machine carries the stationary roll 2; the roll 4 is carried on the reciprocating slide 3. The drive shaft 5, externally of the roll 2, carries the roll 2', spaced from roll 2 and the drive shaft 6, externally of roll 4, supports the roll 4', spaced from roll 4 since the thread rolling machine is adapted to operate on long studs on which threads will be rolled on both ends simultaneously. The work rest 7 between the two rolls, which are driven in the direction of the arrows, supports the work piece 8 to be operated upon. The work pieces 8 are contained in the hopper 9, which has, before the opening 10 of the feed chute 11, two rotating eccentrics 12 and the guide plate 13. These parts serve to feed the work pieces successively into the feed chute 11 which is inclined and which is secured to the frame 1 by the holding device 14. The inclined feed chute 11 discharges into the vertical portion 15 of the feed chute which portion is mounted above the work rest 7 and which discharges between the rolls. This feed chute portion 15 contains the latches 16, 17 and 18 which are rotatable about the pins 19, 20 and 21 and are mounted in the rails 22 and 23. The three latches have the holding projections 24 on their lower lever arm and the latches 17 and 18 have holding projections 25 on their upper lever arm. Latch 16 carries the extended holding projection 26 on its upper lever arm, which projection lies above the mouth of the feed chute 11. The latches are associated with the stop pins 27. The free ends of the latches are linked together by a parallelogram link 28 and are provided with a retracting spring 29 which exerts its tension in the direction of the arrow 30 (Fig. 2). The latches 16, 17 and 18 are, as shown in Fig. 3 mounted in duplicate on the rails 22 and 23.

The arm 31, carrying the abutment 32, is secured to the slide 3. This abutment is made resilient and comprises the guide stud 33, the sleeve 34 journalled thereon, together with the pin 35, on which are seated the nuts 36. Nuts 36 serve as abutments for the compression springs 37. Sleeve 34 has a longitudinal slot 38 and stud 33 is provided with a guide pin 39. The rails 22 and 23 support on their sides, guides 40 for delivering work pieces 8 to the work rest 7.

The manner of operation is as follows:

In Fig. 2 the position is shown to which the abutment 32 with the slide 3 is withdrawn. The tension springs 29 bring all latches into the position shown, in which three work pieces are held in the position shown by the holding projections 24 extending into the vertical portion of the feed chute 11. In the approach movement of the rolls, the abutment 32 strikes the link 28 so that all latches move into the position shown in Fig. 1. The work piece thus far held by the latch 18 falls between the rolls onto the work rest 7. All of the remaining work pieces advance one step. The holding projection 26 of the upper latch 16 moves in front of the mouth of the feed chute 11 and stops the work pieces therein. In the further feeding movement of the rolls necessary for rolling the thread, the resilient abutment moves back against the compression spring 37. This spring is only strong enough to transmit the releasing movement to all of the latches when the link 28 is contacted. Upon return of the slide 3, all latches are again brought into the position of Fig. 2 and the process repeats.

The modified embodiment shown in Figs. 4, 5 and 6 has retaining strips 41 instead of the latches. The strips 41 are resiliently mounted in the brackets 42 and 43 by means of the screws 44 and the compression springs 45. The strips 41 engage the work pieces 8 in the vertical portion 15 of the feed chute 11 and hold them stationary. The strips are adjustable to the diameter of the work pieces being fed and have, at their lower ends where the work pieces are delivered, the projections 41' extending into the chute 15. The lever 46 is positioned above these strips 41 and is rockably mounted on the shaft 47. The part of the lever 46 which swings into the feed chute is formed as a circular segment 48. This segment constitutes the longer lever arm of the lever 46 whose shorter arm is formed by the projection 49. The latter is engaged by an arm 50 of the bell crank 51 which is rockable about the shaft 52 and whose shorter arm is designated as 53. The resilient abutment 55 is secured to the bracket 54 of the slide 3 and is constructed like the resilient abutment shown in Fig. 1. The tension spring 56 is connected to the crank 51. Limitation of the throw of the crank is accomplished by an adjustable abutment 57. The lever mechanism is mounted on a housing 58 adjustably secured on the slide 3.

The manner of operation of this embodiment is as follows:

The work pieces are admitted to the inclined feed chute 11 from the hopper 9 and pass therefrom into the vertical portion 15 of this chute in which they are held by the retaining strips 41 and are prevented from falling out. In the withdrawn position of the abutment 55, the lever mechanism occupies the position shown in Fig. 6, the chute being filled with work pieces. The tension spring 56 has rocked the segment 48 of lever 46 out of the feed chute. The approach movement of the rolls now follows by displacement of the slide 3, so that the abutment 55 engages the lever mechanism, opposing the tension of spring 56 and the segment 48 rocks into the feed chute as shown in Fig. 4 and by dotted lines in Fig. 5. The lower edge of the segment moves between two work pieces and pushes downward the row of work pieces in the vertical portion 15 a distance approximately equal to the diameter of a work-piece, so that the lowest work piece leaves the chute and falls upon the work rest. At the same time the upper part of the rotated segment 48 holds the work pieces in the chute 11, so that the pressure exerted by the segment in the step by step movement of the work pieces in the vertical portion has no effect on those in chute 11. Thereby the release of more than one work piece from the chute is prevented. When the lever 46 has accomplished the required movement, the lever 51 strikes the abutment 57 as is evident in Fig. 4. The additional feeding movement of the threading rolls is not transmitted to the lever mechanism, since the resilient abutment 55 withdraws correspondingly. During the return stroke of the slide 3 the tension spring 56 returns the lever 46 to the position shown in Fig. 6 and the work pieces in chute 11 fall one step forward. Since the work pieces in the vertical portion 15 are at rest, this slight thrust is easily absorbed by the retaining strips so that no work piece is released from the chute in this movement. The process repeats with the next feeding movement of the threading rolls.

I claim:

1. In a machine for forming work pieces, said machine having a pair of work forming members and means for moving one of said forming members toward and away from the other of said forming members, a stationary work piece feeding mechanism comprising a chute for conveying work pieces from a hopper to a work forming position between said forming members, said chute having a vertical end portion above said forming position, a substantially vertical fixed strip forming one side of said chute end portion, a plurality of latches pivotally mounted in aligned vertically spaced relation at one side of said vertical end portion of said chute opposite said strip, each of said latches having upper and lower work holding projections extending into the chute, respectively, above and below their respective pivotal axes, a link connected to each of said latches, means resiliently biasing said link in one direction to simultaneously resiliently urge the lowermost of said projections of each of said latches into said chute to hold said work pieces against said strip, and means mounted for movement with said one forming member to and from said link and adapted to strike the said link in response to movement of said one forming member toward the other forming member to urge said link in the opposite direction to simultaneously pivot said latches about the respective pivotal axes toward a position in which said lower projections release said work pieces and said upper projections engage the next one in the series of said work pieces.

2. In a machine for forming work pieces, said machine having a pair of work forming members and means for moving one of said forming members toward and away from the other of said forming members, a stationary work feed mechanism for successively feeding the work pieces comprising, a chute for conveying work pieces from a hopper to a work forming position between said forming members, said chute having a vertical end portion above said forming position, one side of said chute being rigid, a plurality of escapement latches, means pivotally mounting said latches in two spaced vertical rows in said vertical end portions of said chute opposite said rigid side, said latches each having upper and lower projections extending into said chute on opposite sides of the respective pivotal axes and adapted to engage the work pieces alternately, a first link connected to each of the latches in one of said rows, a second link connected to each of the latches in the other of said rows, means resiliently biasing said links in one direction to resiliently urge the lowermost of said projections of each of said latches into engagement with said work pieces to hold said work pieces against downward movement in said chute, an abutment mounted for movement with one of said work forming members, said abutment being operable in response to movement of said one forming member toward the other forming member to urge each of said links in the opposite direction to dispose the upper projections of each of the latches in contact with the next one in the series of work pieces while moving the lower projections of each of said latches out of contact with said work pieces to thereby permit downward movement of said work pieces in said chute.

References Cited in the file of this patent

UNITED STATES PATENTS

| 1,431,493 | Thomas | Oct. 10, 1922 |
| 1,585,414 | Pritchard | May 18, 1926 |
| 2,341,014 | Blair | Feb. 8, 1944 |
| 2,350,486 | Bailey | June 6, 1944 |
| 2,519,164 | Watkins et al. | Aug. 15, 1950 |
| 2,627,767 | Batchelder | Feb. 10, 1953 |